United States Patent [19]

Tsai

[11] Patent Number: 5,120,226
[45] Date of Patent: Jun. 9, 1992

[54] TOY AND TEACHING AID COMBINATION

[76] Inventor: Lien S. Tsai, No. 22, Lane 22, Chung Ping Rd., Tai Ping Hsiang, Taichung Hsien, Taiwan

[21] Appl. No.: 639,570

[22] Filed: Jan. 10, 1990

[51] Int. Cl.$^5$ .............................................. G09B 19/92
[52] U.S. Cl. ..................................... 434/195; 434/208
[58] Field of Search ......................... 434/195, 208, 128

[56] References Cited

U.S. PATENT DOCUMENTS

| | | | |
|---|---|---|---|
| 2,809,443 | 10/1957 | Hospodar | 434/195 |
| 2,892,267 | 6/1959 | Harvey | 434/208 |
| 3,229,388 | 1/1966 | Smith | 434/195 |
| 3,403,460 | 10/1968 | Barrows | 434/208 |
| 3,414,986 | 12/1968 | Stassen | 434/195 |

*Primary Examiner*—John G. Weiss
*Assistant Examiner*—Michael Lynch
*Attorney, Agent, or Firm*—Merchant, Gould, Smith, Edell, Welter & Schmidt

[57] ABSTRACT

A toy includes a casing having a number of holes formed in an upper surface. A board which has a number of symbols printed on an upper surface is insertable into the bottom of the casing. A number of blocks, each can be inserted into a hole. An opening is formed in each of the blocks. A tongue is formed on each of the blocks and is engageable within the opening of another block so that the blocks can be assembled together. A numeral is printed on each of the tongues. Children can select and insert a block into a hole which has a numeral identical to that of the block so that the toy can also be used as a teaching aid.

7 Claims, 6 Drawing Sheets

TOY AND TEACHING AID COMBINATION

FIELD OF THE INVENTION

The present invention relates to a toy, and more particularly to a toy and teaching aid combination.

BACKGROUND OF THE INVENTION

Various kinds of toys and teaching aids are available today. However, the toys and the teaching aids are available individually.

The present invention has arisen to provide a toy combination which can also be used as a teaching aid.

SUMMARY OF THE INVENTION

The primary object of the present invention is to provide a toy and teaching aid combination which can be used as a toy and can also be used as a teaching aid.

In accordance with one aspect of the present invention, there is provided a combination which includes a casing having a number of holes formed in an upper surface and having four sides walls formed on the perimeter. A pair of flanges are longitudinally formed on two sides of a bottom of the casing and extending inward of the casing so that a pair of slots are formed above the flanges. A board has a number of numerals printed on an upper surface and is insertable into the slots of the casing. A number of blocks, each can be inserted into one hole. An opening is formed in each of the blocks. A tongue is formed on each of the blocks and is engageable within the opening of another block so that the blocks can be engaged with one another. A numeral is printed on each of the tongues. Children can select and insert a block into a hole which has a numeral identical to this block so that the combination can be used as a teaching aid. The blocks can be assembled to various shapes so that the combination can be used as toys.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
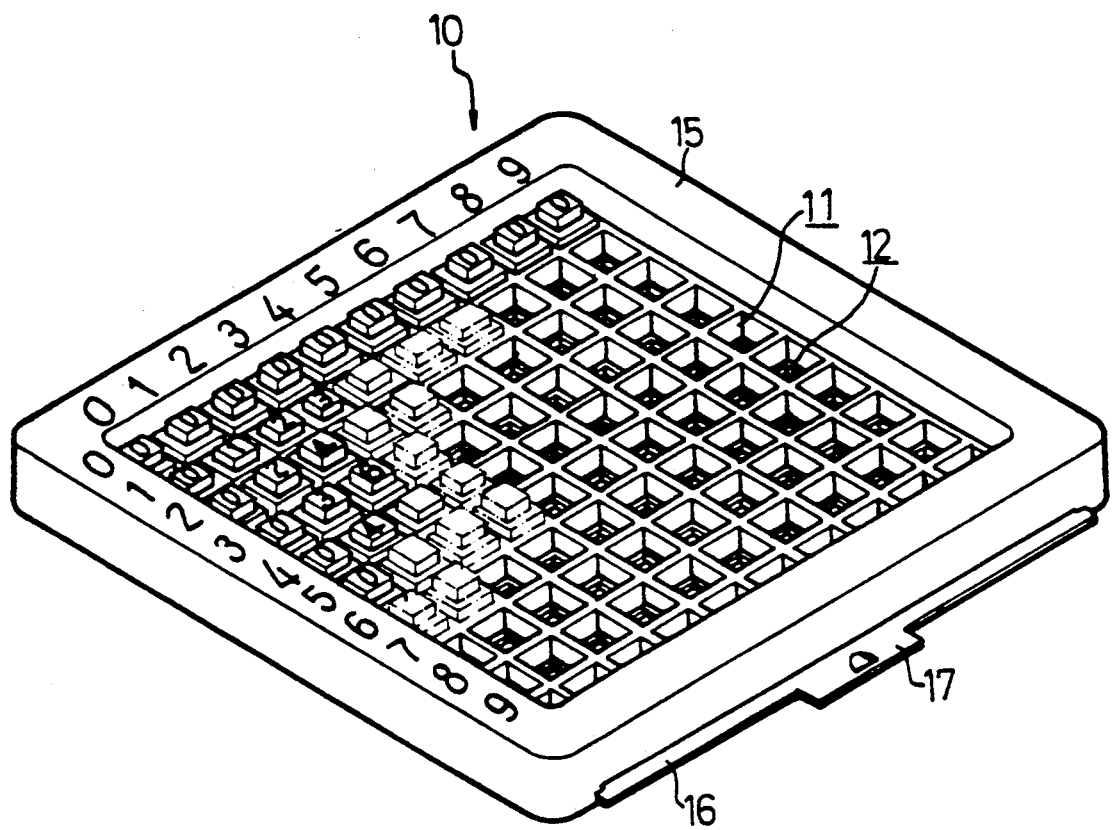
FIG. 1 is a perspective view of a toy and teaching aid combination in accordance with the present invention.
Figure 2:
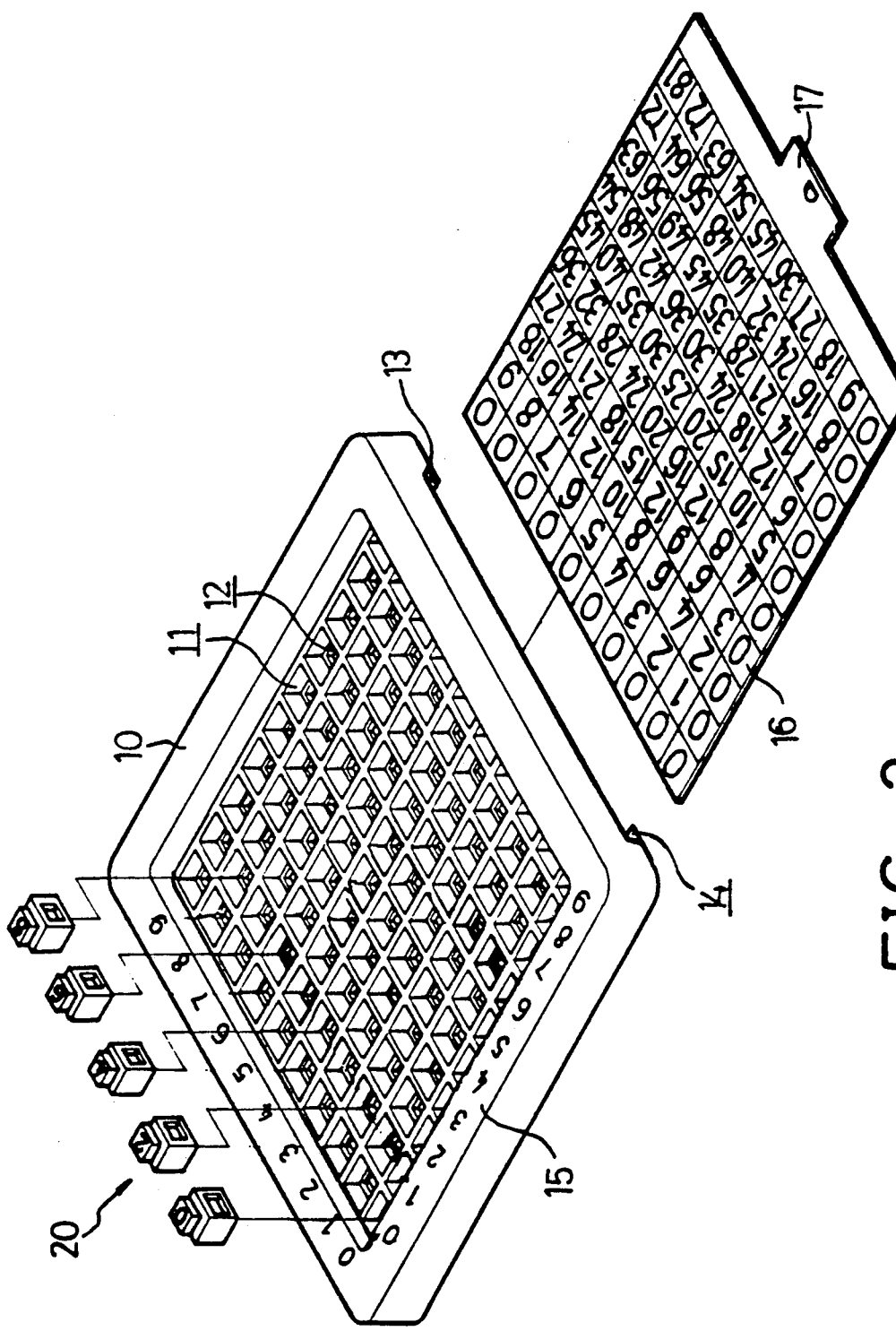
FIG. 2 is an exploded view of the combination.
Figure 3:
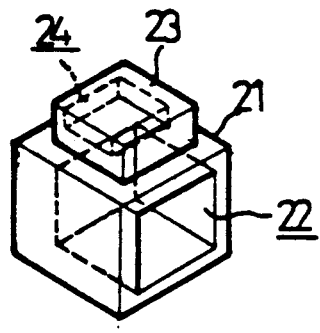
FIGS. 3 to 10 are perspective views illustrating a plurality of blocks.
Figure 4:
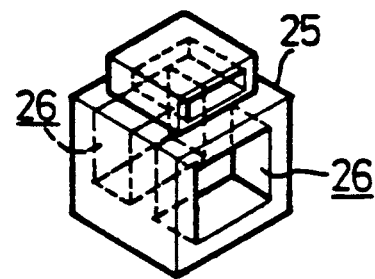
Figure 5:
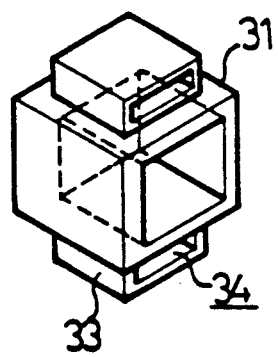
Figure 6:
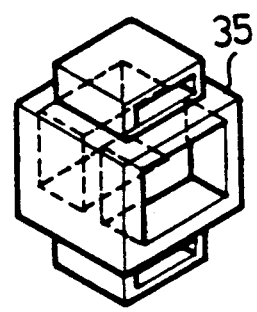
Figure 7:
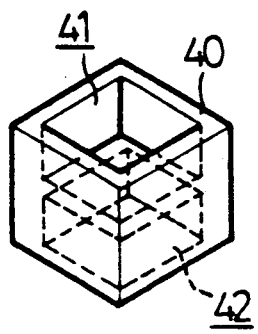

Referring to the drawings and initially to FIGS. 1 and 2, a toy and teaching aid combination in accordance with the present invention comprises generally a casing 10 having a plurality of holes 11 formed in the upper surface thereof and having side walls 15 formed on the perimeter thereof, a board 16 insertable to the bottom of the casing 10, and a plurality of blocks 20 insertable into the holes 11. As shown in the drawings, the casing 10 is cubic. Alternatively, the casing 10 can be rectangular.

The holes 11 are aligned and are preferably arranged such that each side has ten holes which have a corresponding numeral provided on the upper surfaces of the side walls 15. An aperture 12 which has a shape similar to that of the holes 11 and which has a smaller size than that of the holes 11 are formed in the bottom of each of the holes 11 so that a shoulder is formed between the aperture 12 and the hole 11. A pair of flanges 13 are longitudinally formed on two sides of the bottom of the casing 10 and extend inward so that a pair of slots 14 are formed above the flanges 13. Both sides of the board 16 can be inserted into the slots 14 and are slidable therein so that the board 16 can be inserted into the bottom of the casing 10. An ear 17 is formed on the middle portion of the rear side of the board 16 so that the board 16 can be drawn out from the bottom of the casing 10. A plurality of symbols, such as numerals and characters are printed on the upper surface of the board and are located below the holes 11 when the board 16 is inserted into the casing 10. The numerals, for example, as shown in FIG. 2, altogether form a multiplication table. Each of the numerals is a result when multiplying the corresponding numerals provided on the side walls 15 of the casing 10. Each of the blocks 20 has a numeral printed on the outer surface thereof and can be inserted into each of the holes 11. Children can select a block which has a numeral printed thereon and can insert this block into the hole 11 from which an identical numeral can be seen therein so that the combination in accordance with the present invention can be used as teaching aid. The lower surfaces of the blocks 20 can be painted with different colors. Alternatively, other symbols, such as English letters can be printed on the board 16 for teaching English alphabet.

Referring next to FIGS. 3 to 7, illustrated are five examples of the blocks 20. The block 21 has an opening 22 formed in the cubic body thereof and has a tongue 23 integrally formed on the upper surface thereof. A numeral can be printed on the upper surface of the tongue 23. A recess 24 is formed on a lateral side of the tongue 23. The tongue 23 has a reduced size so that a shoulder is formed between the tongue 23 and the body of the block 21. The tongue 23 can be engaged within the aperture 12 when the cubic body of the block is received in the hole 11. In addition, the tongue 23 can be engaged with the opening 22 of another block 21 by such as force-fitted engagement so that the blocks 21 can be engaged with each other. The block 25 is identical to the block 21 except that two openings 26 are formed in the opposite sides of the body of the block 25. The tongue 23 is engageable with either of the openings 26. The blocks 31, 35 are identical to the blocks 21, 25 respectively except that a tongue 33 with a recess 34 formed therein is formed on the other side of the body opposite to the tongue 23. The lower surfaces of the tongues 33 can be printed with various colors. The block 40 has two openings 41, 42 oppositely formed therein. The blocks 21, 25, 31, 35 and 40 are all insertable into the respective holes 11.

Figure 9:
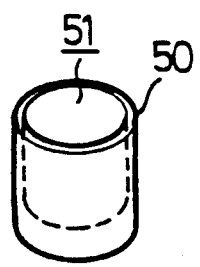
Figure 10:
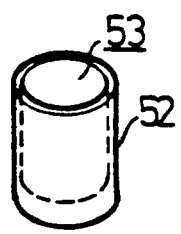
Figure 8:
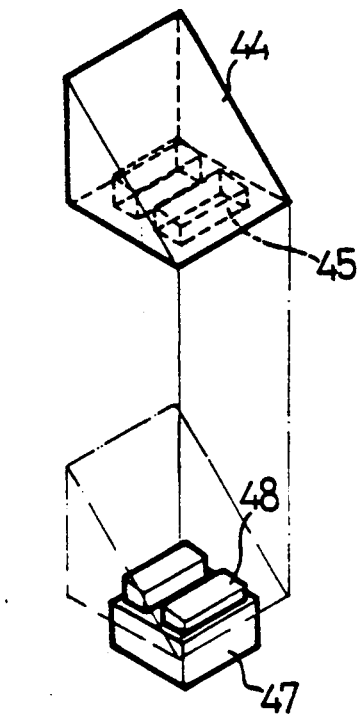

Referring next to FIGS. 8 to 10, illustrated are another examples of the blocks 20. The block 44 which is triangular has two cavities 45 formed on one side surface thereof. A retainer 47 has two ribs 48 formed thereof. The ribs 48 are engageable within the cavities 45 of the block 44. The retainer 47 can be engaged within either of the openings 22, 26, 41, 42 so that the block 44 can be coupled to either of the blocks 21, 25, 31, 35, 40 as shown in FIGS. 3 to 7. The blocks 50 and 52 are cylindrically shaped, each has a recess 51, 53 formed therein. The block 52 can be engaged within the recess 51 of the block 50, and can be engaged within either of the openings 22, 26, 41, 42 so that the block 50 can be coupled to either of the blocks as shown in FIGS. 3 to 7.

Figure 11:
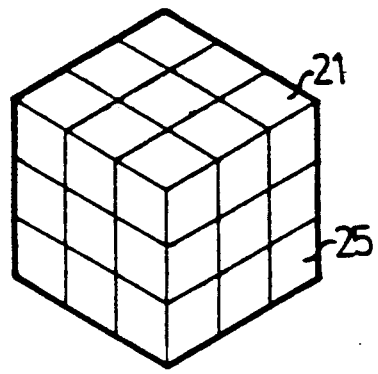
FIGS. 11 to 13 are perspective views embodying the present invention.
Figure 12:
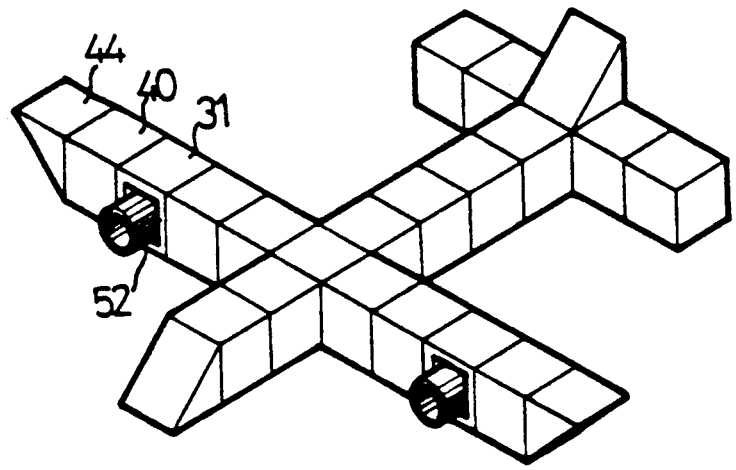
Figure 13:
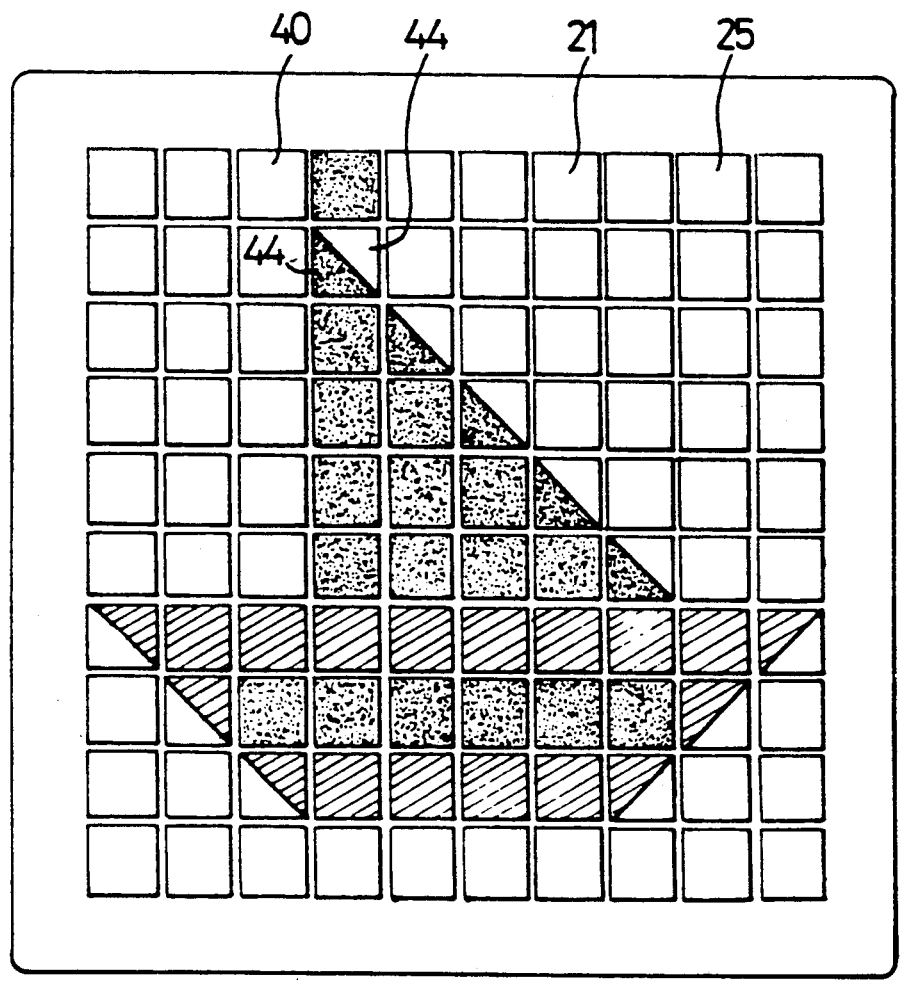

Referring next to FIGS. 11 and 12, the blocks as shown in FIGS. 3 to 10 can be assembled to various shapes so that the combination in accordance with the present invention can be used as toys. Referring next to FIG. 13, when the blocks 21, 25, 40, 44 etc., are disposed within the holes 11 and are arranged such that the colored sides thereof are disposed upward, the colors of the blocks can be arranged to form various kinds of patterns. For example, a ship is formed and shown on the upper surfaces of the blocks.

Accordingly, the combination in accordance with the present invention can be used either as a teaching aid or as a toy.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A combination comprising:
   a casing having a plurality of holes formed in an upper surface thereof and having four sides walls formed on the perimeter thereof, a pair of flanges being longitudinally formed on two sides of a bottom of said casing and extending inward of said casing so that a pair of slots are formed above said flanges;
   a board having two sides insertable into said slots of said casing so that said board is insertable into said bottom of said casing, a plurality of symbols being printed on an upper surface of said board, each of said symbols can be seen from a respective holes of said casing when said board is inserted into said bottom of said casing; and
   a plurality of blocks, each can be inserted into either of said holes of said casing, an opening being formed in each of said blocks, a first tongue being formed on a surface of each of said blocks and being engageable within said opening of another block so that said blocks can be engaged with one another, a numeral being printed on an outer surface of each of said first tongues; and
   children can select a block and insert this block into a hole which has a numeral identical to this block so that said combination can be used as a teaching aid; and said blocks can be assembled to various shapes so that said combination can be used as toys.

2. A combination according to claim 1, wherein an aperture is formed in a bottom of each of said holes of said casing and has a size smaller than that of said holes so that a shoulder is formed between said hole and said aperture, said first tongue of each of said block is engageable within said aperture when said block is received in said hole.

3. A combination according to claim 2, wherein a second tongue is formed on each of said blocks opposite to said first tongue, said numeral is printed on said outer surface of each of said first tongue, an outer surface of each of said second tongue is colored and can be faced upward when said blocks are received in said holes so that said blocks can be arranged to form various shapes of patterns.

4. A combination according to claim 1, wherein each of said blocks has a pair of openings oppositely formed therein, said first tongue is engageable with either of said openings so that said blocks can be assembled together.

5. A combination according to claim 4, wherein a second tongue is formed on each of said blocks opposite to said first tongue, said numeral is printed on said outer surface of each of said first tongue, an outer surface of each of said second tongue is colored and can be faced upward when said blocks are received in said holes so that said blocks can be arranged to form various shapes of patterns.

6. A combination according to claim 1, further comprising a plurality of triangular blocks, a pair of cavities are formed on one side surface of each of said triangular blocks, a retainer has two ribs formed on one surface thereof, said ribs are engageable within said cavities of said blocks, and said retainer can be engaged within said opening of either of said blocks so that said triangular block can be engaged to either of said blocks.

7. A combination according to claim 1, further comprising a plurality of first cylindrical blocks each having a first recess formed therein and a plurality of second cylindrical blocks each having a second recess formed therein, said second cylindrical blocks are engageable within said first recess of said first cylindrical blocks and are engageable within either of said openings of said blocks so that said first cylindrical blocks can be engaged to either of said blocks.

* * * * *

UNITED STATES PATENT AND TRADEMARK OFFICE
CERTIFICATE OF CORRECTION

PATENT NO. : 5,120,226
DATED : June 9, 1992
INVENTOR(S) : Tsai

It is certified that error appears in the above-indentified patent and that said Letters Patent is hereby corrected as shown below:

Title page, item [76], inventor, "Lane 22" should read--Lane 52--.

[22], Filed, "Jan. 10, 1990" should read--Jan. 10, 1991--.

Column 3, line 36, Claim 1, "holes" should read--hole--.

Signed and Sealed this

Thirtieth Day of November, 1993

Attest:

BRUCE LEHMAN

*Attesting Officer*  *Commissioner of Patents and Trademarks*